(No Model.)
R. B. CHAMBERS.
FLEXIBLE BELT FENDER FOR STREET RAILWAY CARS.
No. 522,147. Patented June 26, 1894.
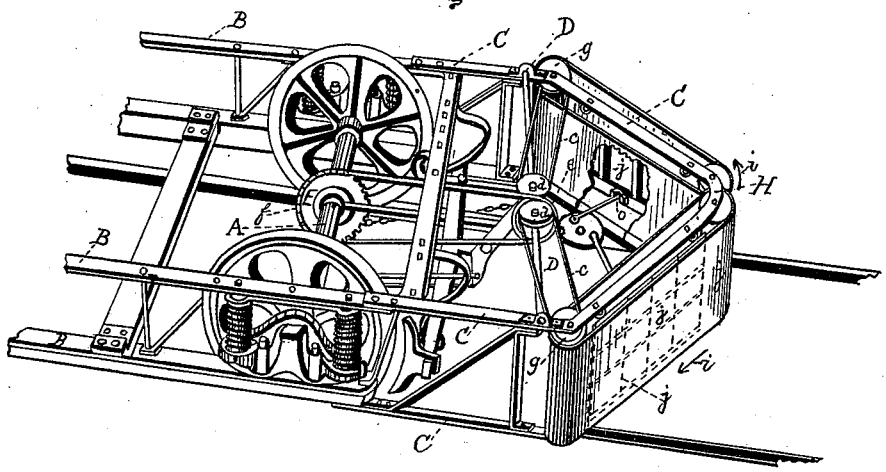
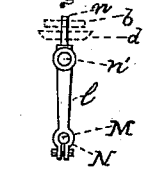
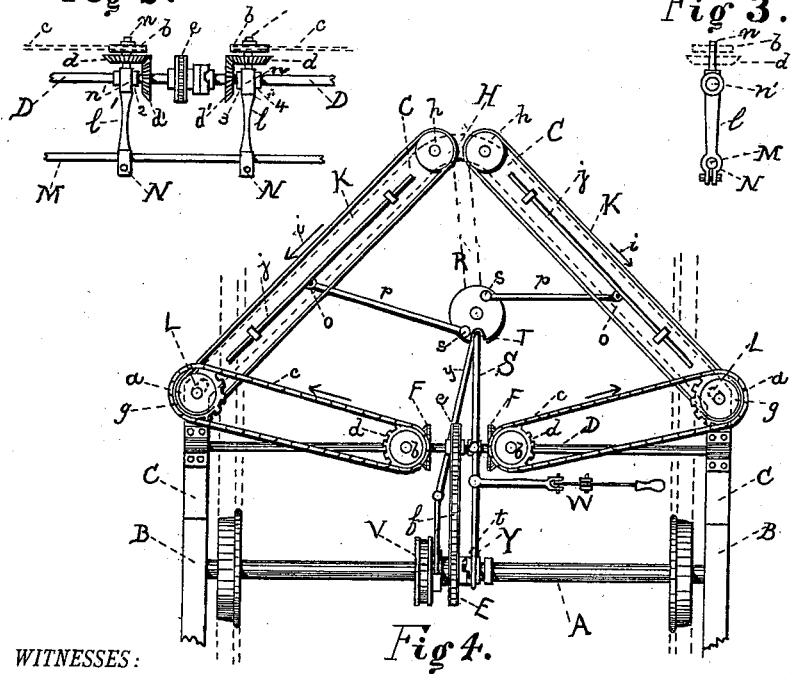
WITNESSES:
Eugene P. Eadson
E. B. Williams
INVENTOR
Richard B. Chambers
BY Geo. H. Holgate
ATTORNEY

UNITED STATES PATENT OFFICE.

RICHARD B. CHAMBERS, OF CHESTER, PENNSYLVANIA, ASSIGNOR TO CROSBY M. BLACK, OF SAME PLACE.

FLEXIBLE-BELT FENDER FOR STREET-RAILWAY CARS.

SPECIFICATION forming part of Letters Patent No. 522,147, dated June 26, 1894.

Application filed March 6, 1894. Serial No. 502,544. (No model.)

*To all whom it may concern:*

Be it known that I, RICHARD B. CHAMBERS, a citizen of the United States, residing at Chester, in the county of Delaware and State of Pennsylvania, have invented a new Flexible-Belt Fender for Street-Railway Cars, of which the following is a specification.

My invention relates to the improvement on life saving fenders for street railway cars, using either steam, electricity, cable, gas, compressed air, or any other motive power, and the objects of my invention are: First, to supply a life saving fender for street railway cars which will be secure, reliable, practicable and inexpensive. Second, to provide a fender so constructed that it can be readily applied to all or any trucks, as now used under street cars, new or old. Third, to make a mechanically moving or revolving guard or fender for street railway cars that will be equally efficient in its results when stationary, as it would be when in motion. Fourth, to reduce to the lowest minimum the force of the blow, upon the fender striking the obstacle, by the elasticity or giving way of the flexible belt, and by this giving way or flexibility of the same, to operate automatically the mechanism controlling the traveling endless belts, and putting the fender in operation, if any person or obstruction is struck unnoticed by the operator in charge of the motive power of car, supplying a greater means of security, and prevention of accidents causing loss of life and limb.

To accomplish the purposes of my invention, I construct a front frame work, carrying revolving rollers, having flexible belts of any suitable material, which travel in opposite directions to each other, and so arranged that in case of accident, or any obstacle being struck unnoticed by the party operating the car, the belts will be automatically started on their movements, the power being taken from the axle of the truck or car, and transferred to the belts by suitably arranged mechanism.

To fully describe the several parts, my invention consists of a loose or fast sprocket wheel or pulley, suitably arranged and provided with a friction cam, or other clutch, or their equivalent, preferably on the front axle of the truck or car. This sprocket wheel or pulley is provided with sprocket chain, or if pulley is used, by any other flexible belt, to drive or impart its motion to a corresponding or similar wheel or pulley on a shaft, which is supported or carried by the main frame of the truck, or by the attached frame in front of the truck carrying the rollers and belts, and which frame comprises a part of the invention. This shaft has two bevel gears which engage with two other beveled gears placed horizontally on two upright and adjustable bearing spindles, which also carry two sprocket wheels or pulleys, driving direct to the sprocket chain wheel or pulley for the chain or flexible driving belt, on the top or bottom of the rollers, carried by the front frame, and transferring their motion to the rollers around which the endless flexible belt forming the fender revolves. Suspended from the upper rail of the fender frame, and hanging down inside of each revolving belt, is a lightly constructed shield or auxiliary fender, arranged so that it can swing inwardly, and connected by a pivoted rod or other suitable means to a semi-rotating, table plate, or wheel, having at any side most suitable, a recess or opening, in which the end of the pivoted clutch rod engages, thereby producing a reliable, automatic device for putting the revolving fender belts in motion, the action of which is as follows:

Should the belts be at rest and any object or person is struck unnoticed by the operator of the car, the obstacle, on striking against either of the flexible belts, or falling against them, pushes inwardly and, coming in contact with the interior, or auxiliary fender or guard, the guard is pushed or forced inwardly, and by it, connection with the rod to the semi-rotating table or yoke, or its equivalent, the power is applied, and the belts revolve rapidly, carrying by a frictional contact, any obstacle against the fender, in a direction toward the outside of the track, and to a point beyond the tread of the car wheels, in an uninjured condition.

For economy, compactness and simplicity of construction, in applying my invention to car trucks, whose construction is similar to the one shown in my drawings, I construct a vertical, stationary and adjustable bearing shaft, having its extreme topmost end turned down and forming a journal post on which the horizontal gear and sprocket or pulleys driving the rollers are placed. The counter driving shaft rotates freely through this stationary vertical shaft, and acts as a support or main bearing for it, keeping it in its proper position by an adjustable collar or other suitable means placed on each side, on and rotating with the shaft. The lower end of the stationary vertical shaft has its support on a stationary bar or brace of the frame work, and is adjustable by the construction of the open or split sleeve and clamping screw at its base, or other suitably arranged device. This construction or arrangement of mounting the gears, sprocket wheels or pulleys, driving the flexible belts, &c., is designed to facilitate any desired change in the set of the bevel gears, or in putting on or taking off the driving chains or belts, or allowing for any variation made in the driving rollers of the flexible belts of the fender, in changing their tension.

I construct a double clutch arranged on the axle of the car, having one side to cause engagement on and with the axle, and provided on its other side with a suitably arranged friction clutch, having its outside edge formed as a suitable pulley or drum, to which is attached an auxiliary chain, connected to the ordinary brake chain, or to the brake chain pulling or lever bar, providing a reliable means of automatically applying the brake. In the event of the fender or flexible belt striking any obstacle or person, the inner guard frame before mentioned, throws on the clutch of the revolving gear, and from the connection made from the same, the double clutch is engaged with the axle and the friction clutch and drum, or pulley with its chain,—puts on the brake; the friction clutch allowing sufficient slip, to prevent the breaking of the chain, or any other working parts, through being suddenly thrown into operation, and at the same time, applying the brake quicker and more efficiently than could be done by the hand of the car operator.

I attain the objects of my invention, as described, by the mechanism or attachments to street railway cars, shown in the accompanying drawings, where for illustration and to clearly describe the practical operation of my invention, I have shown a portion of the front truck of a car.

Figure 1 is a perspective view of the front portion of the car truck, with my invention attached. Fig. 2 is a front elevation of the counter shaft, showing the bevel gears, sprocket wheels or pulleys for driving the flexible belts, and the stationary vertical shafts, with the adjustable collars, and adjustable clamp on the bar or brace below. Fig. 3 is a side elevation of the stationary vertical shaft. Fig. 4 is a ground plan or top view of my invention, attached to a portion of the car truck.

Similar letters and numerals refer to the same parts throughout the several figures.

In Fig. 1, A is the front anxle of the car truck, B the frame of the car truck, C C the attachable frame, carrying the flexible belts and other parts, and forming part of my invention, D the main shaft, driven by the sprocket wheel E, and chain $f$, or their equivalent, by their action on wheel $e$ on the shaft D, imparting motion by the shaft D to each of the adjustable bevel gears F F that engage with the horizontal, or otherwise, gears $d\ d$ and sprocket wheels or pulleys $b\ b$, and driving through the agency of the chains or belts $c\ c$, the sprocket wheels or pulleys $a\ a$, at the top or base of the belt rollers $g\ g$, and thereby forming the direct driving power for both belts around the rollers $h\ h$ at the front of the attached frame C C. The top and bottom pieces of the framework C C are rounded back, as shown at H, making it impossible for any obstacle or person to be struck by the framework, and allowing the full effectiveness of the flexible belts K K, each moving in a direction toward the rear, as shown by the arrow marks $i\ i$. The belt rollers $g\ g$ revolve in movable or adjustable bearings, which are adjustable forward or backward by means of the slots L L in the top and bottom frames C C. The stationary vertical shafts $l\ l$ have their bearings on the shaft D and are adjustable by the collars 1, 2, 3, 4, and the clamps N on the rod or brace M. The stationary vertical shaft $l$ has the journaled end at the top $n$ on which set the sprockets or pulley wheels $b$ and $d$.

The swinging guard or fender frame $j$ is suspended from the top rail or plate of the frame C C and swings freely by any suitably arranged construction, inside or between the sides of the flexible belts K K. The connecting rods $p\ p$ are secured by the joint $o$ at the bottom of the swinging guard frame $j$, and pass over or across the bottom rail of frame C and under the edge of the flexible belts K K to the pivoting table or semi-rotary yoke R or its equivalent, and are pivoted by suitable means at $s\ s$. This pivoting table or semi-rotary yoke R is mounted on a vertical rod extending downward, said rod being secured to a part of the framework extending rearwardly from the bottom piece of the framework C, at H (as shown by dotted lines in Fig. 4), and is cut out on a central line with the clutch rod or arm S at the point T forming a slipping notch, in which the rounded end of the clutch rod S engages, and as the rod $p$ is pushed by the swinging frame $j$, the thrust imparted in the direction of the angle of rod $p$, the pivoting table or semi-rotary yoke R, by its motion, and engaging by the slipping notch T with the clutch rod S throws in or out of gear, the clutch on the axle of the car at $t$.

V is the friction clutch and drum, to which is attached the brake chain and engages only when the belts are thrown into operation by the automatic mechanism connected with the swinging frame $j$ by the operation of the rod $y$.

W is the hand or foot lever by which the operator of the car throws into gear the driving clutch Y and driving gear of the flexible belts K K.

Having thus described my invention, what I claim as new, and desire to secure by Letters Patent, is—

1. The flexible traveling endless belts K K, having the adjustable rollers $g$ $g$, arranged in the sliding bearing in slots L L, and the swinging shields or frames $j$ $j$ with their connecting rods $p$ $p$ and operating the pivoted table or semi-rotary yoke R, having recess T, and imparting its motions by the rods S and $y$, to the clutch $t$ and friction clutch V, and hand or foot lever W, and the stationary vertical bearing shafts $l$ $l$, substantially as described, combined and operating substantially as set forth.

2. The pivoted or swinging shields or frames $j$ $j$ and the traveling endless flexible belts K K, arranged so that any pressure or depression made in or against the flexible belts K K and operating the rods $p$ $p$ and lever S with the clutch $t$ and wheel E with the chain or belt $f$, the wheel $e$ and the shaft D, with the gear wheels $d'$ $d'$ and operating the bevel gears $d$ $d$, supported by the vertical shafts $l$ $l$, the sprocket wheels $b$ $b$ driven by the belts or chains $c$ $c$, the adjustable wheels and belt rollers $g$ $g$, substantially as described.

3. The swinging or automatic shield frames $j$ $j$ in combination with a flexible endless belt fender, with rods $p$ $p$, and the rocking disk table, or yoke R, having recess notch T, or means of operating the clutch rods S and $y$, substantially for the purpose specified.

4. The combination with the shaft D and the adjustable collars 1 2 3 4 mounted thereon; of the vertical adjustable bearing shafts $l$ $l$, mounted on said shaft and located between said collars; having sliding bearings $n$ $n$ at their upper ends and having at their lower ends sliding adjustable clamps N N adapted to be adjustably secured to brace M, substantially as described.

In testimony whereof I affix my signature in the presence of two witnesses.

RICHARD B. CHAMBERS.

Witnesses:
   G. WHITNEY WOOD,
   C. M. BLACK.